Aug. 15, 1967          J. B. WEST              3,335,665
                      SAUCE DISPENSER
Filed May 6, 1965                          5 Sheets-Sheet 1

INVENTOR
JOHN B. WEST
BY *Albert J. Kramer*
ATTORNEY

Aug. 15, 1967  J. B. WEST  3,335,665
SAUCE DISPENSER

Filed May 6, 1965  5 Sheets-Sheet 2

INVENTOR
JOHN B. WEST

BY *Albert J. Kramer*
ATTORNEY

INVENTOR
JOHN B. WEST
BY Albert J. Kramer
ATTORNEY

Aug. 15, 1967

J. B. WEST 3,335,665

SAUCE DISPENSER

Filed May 6, 1965

INVENTOR
JOHN B. WEST

BY *Albert J. Kramer*

ATTORNEY

INVENTOR
JOHN B. WEST

BY *Albert J. Kramer*

ATTORNEY

United States Patent Office 3,335,665
Patented Aug. 15, 1967

3,335,665
SAUCE DISPENSER
John B. West, Pikesville, Md., assignor to Maryland Cup Corporation, Owings Mills, Md., a corporation of Maryland
Filed May 6, 1965, Ser. No. 453,712
4 Claims. (Cl. 103—40)

ABSTRACT OF THE DISCLOSURE

A liquid dispenser is especially adapted for thick sauces such as that used in manufacturing confectionery items. It is adapted to automatic operation as an auxiliary unit on a basic confectionery machine. The liquid is held in a reservoir and is fed to a chamber. The chamber is charged by a pump and a valve controls the flow of liquid from the chamber to a passageway. A second valve controls the flow of liquid from the passageway to an outlet nozzle. Means are provided for operating the valves and pump to cause a unit quantity of liquid to be dispensed on each cycle of operation. Means are also provided to change the operation of the valves and pump relative to each other to change the unit quantity of liquid delivered on each cycle.

---

This invention relates to dispensers and it is more particularly concerned with a machine for dispensing liquids such as confectionery sauces of chocolate, fudge, and other viscous liquids.

An object of the invention is the provision of a dispensing machine unit which is especially useful in dispensing confectionery sauces into containers in the process of forming prepackaged confectionery products such as ice cream sundaes, parfaits, etc.

Another object of the invention is the provision of such a machine adapted for attachment to a station of a base filling machine and which can be operated in conjunction with other stations to deliver a predetermined quantity of the sauce to the container in a programed sequence of operations.

A further object of the invention is the provision of such a dispensing unit which can be adjusted to deliver different quantities of sauce on each cycle of operation.

A still further object is a unit of the type mentioned which is rugged, positive in operation, long wearing, easy to use and which is not likely to get out of working order over long periods of use.

These object and still further objects, advantages and features of the invention will appear more fully from the following description considered together with the accompanying drawing to which the description refers.

In the drawing:

FIG. 13 (Sheet 4) is a vertical sectional view along the line 13—13 of FIG. 8.

Figure 1:
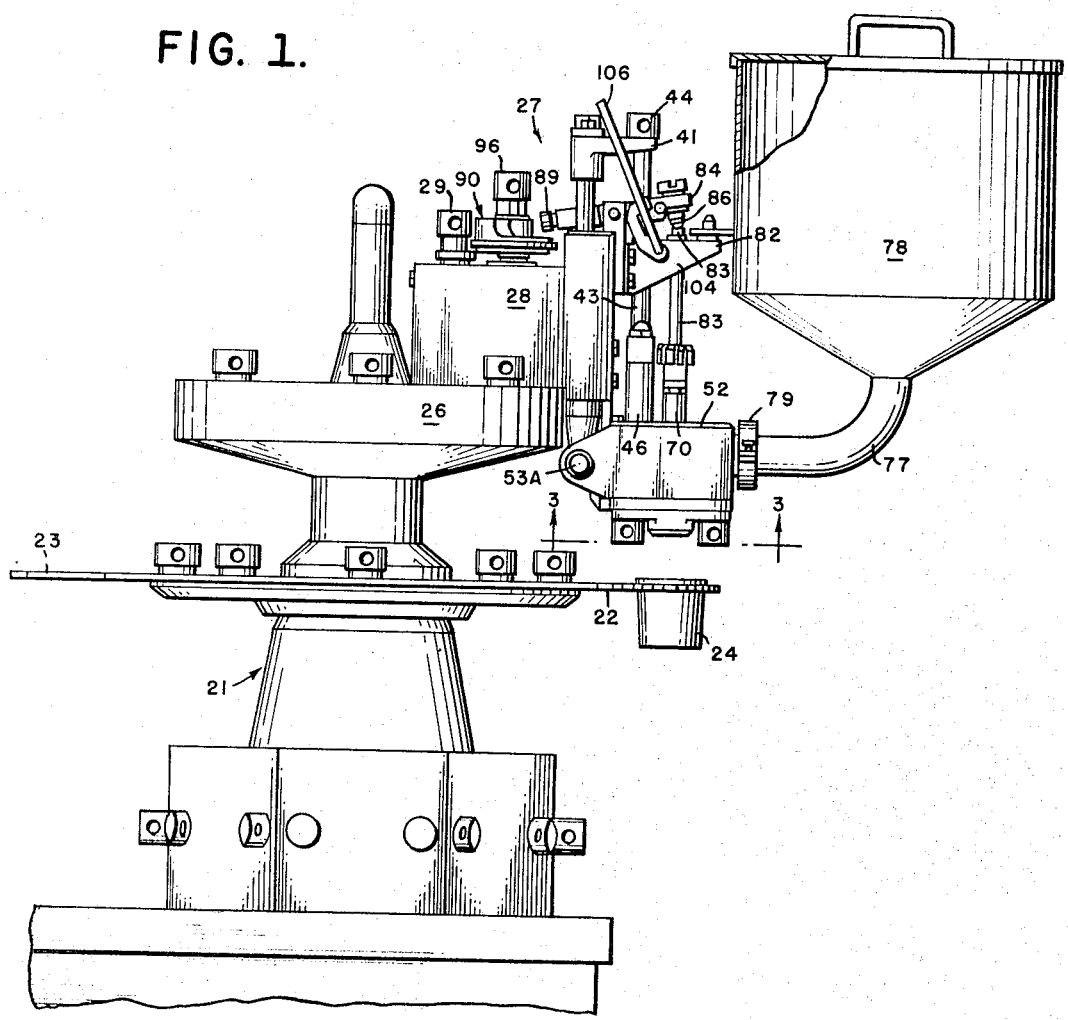
FIG. 1 (Sheet 1) is a side elevational view of an embodiment of the invention, partly broken away, attached to a base filling machine, the latter being shown fragmentarily.
Figure 3:
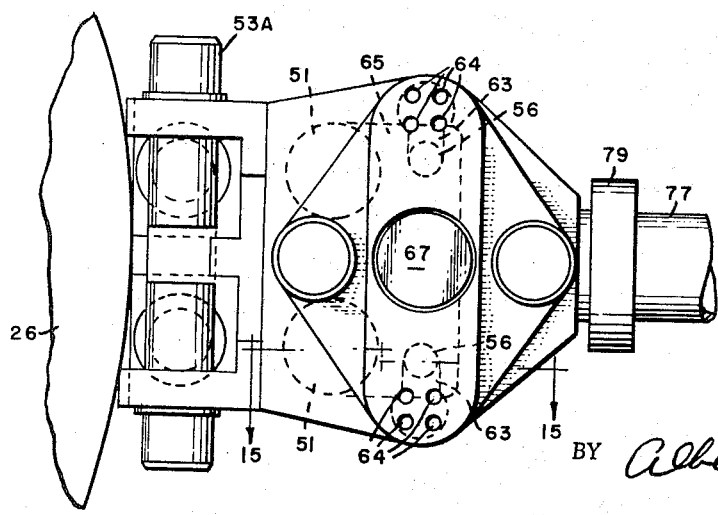
FIG. 3 (Sheet 1) is a bottom plan view along the line 3—3 of FIG. 1.
Figure 2:
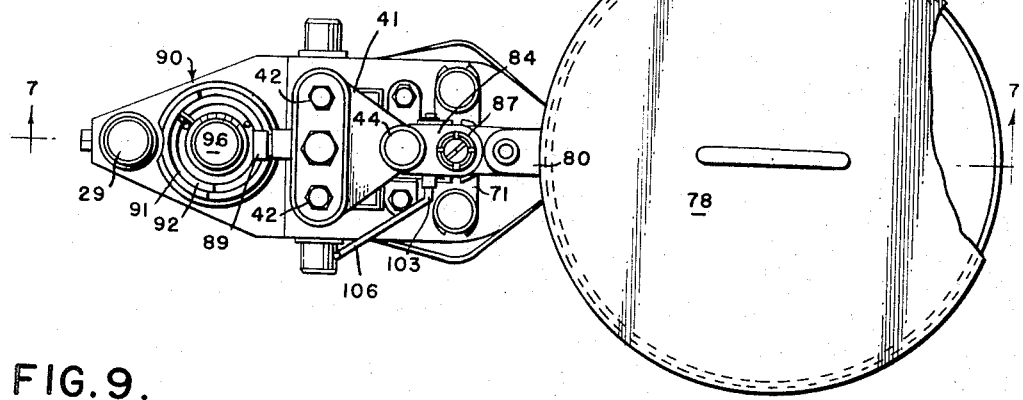
FIG. 2 (Sheet 2) is a top plan view of the embodiment of FIG. 1, partly broken away.
Figure 9:
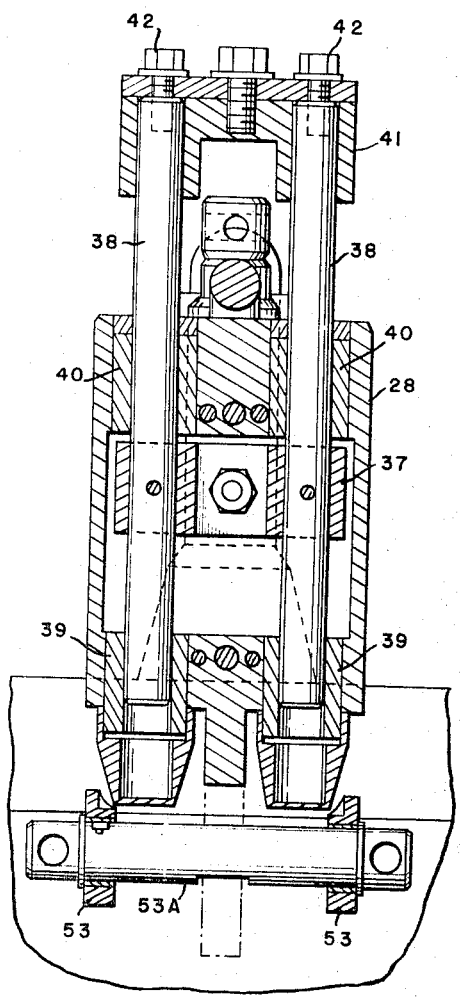
FIG. 9 (Sheet 2) is a section along the line 9—9 of FIG. 8.

Referring to the drawing with more particularity, the embodiment illustrated is adapted to a base machine 21 which is fully described in co-pending application, Ser. No. 292,359, now Patent No. 3,225,889, to which reference is made for a complete description. For the purpose of understanding the present invention, it is sufficient to describe the machine 21 as comprising a loading wheel 22 provided with apertures 23 for holding containers 24 that are to be filled and capped at various stations defined by auxiliary units attached to the machine. The present invention may be considered one such unit. A driving gear 25 is contained in the housing 26 above the loading wheel 22. The housing 26 is structurally capable of supporting the auxiliary unit 27 which comprises the embodiment of the present invention.

The unit 27 comprises a housing 28 which is disposed on top of the base machine housing 26 and secured thereto by bolt 29. On the interior of the housing 28 is a vertical barrel cam 30 secured to a vertical shaft 31 for rotation therewith. The shaft is rotatably mounted in bearings 32 and 33 and its lower end is provided with a pinion 34 which meshes with the driving gear 25. The barrel cam 30 has a peripheral camming groove 35 which receives a cam follower in the form of a roller 36 mounted on a crosshead. The crosshead is securely clamped to vertical reciprocating shafts 38 within the housing. The lower ends of the shaft 38 move in guide bushings 39 fixed to the housing 28 and the upper ends project upwardly through guide bushings 40 to the exterior of the housing and are connected to a header plate 41 by bolts 42. The header plate 41 extends outwardly and it is attached to the upper end of a vertical connecting rod 43 by a bolt 44. The lower end 45 of the rod 43 is recessed and attached to a horizontal cross bar 46 by a nut 47. The outer ends of the bar 46 are connected to the recessed ends 48, respectively, of a pair of pump plunger rods 49. The lower ends of these rods are each in the form of spaced annular flanges 50 straddling sealing rings 50A slidably engaged with and adapted to reciprocate along the walls of a pair of cylinder bores 51, respectively, of a block 52. The block 52 is fixedly secured to a dependent plate 53 of the housing 28 by any suitable means, such as a conventional cam lock 53A.

Figure 14:
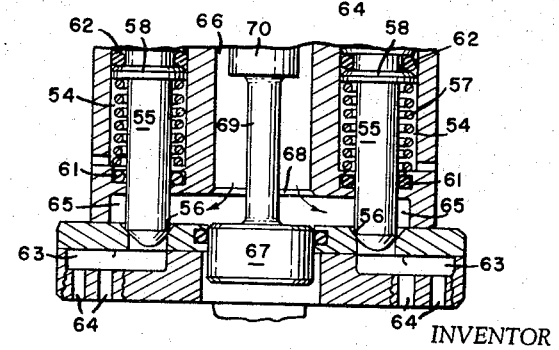
FIG. 14 (Sheet 3) is a sectional view along the line 14—14 of FIG. 7.

The block 52 is provided with a pair of cylinder bores 54 outwardly displaced from the cylinder bores 51. The bores 54 contain valve stems 55, the lower ends of which are adapted in their lowermost positions to contact valve seats 56 (see FIG. 14).

The valve stems 55 are urged to an upward position by means of coil springs 57 between collars 58 of the stems and annular shoulders 59 of the bores. Annular channels 60 below the shoulders 59 contain sealing O-rings 61. Sealing O-rings 62 are also disposed at the upper ends of the stems above the collars 58.

The valve seats 56 are situated at the upper ends of passageways 63 that lead to outlet openings 64 along the bottom of the block 52 or any other desired form of dispensing nozzle.

Above the valve seats 56, a horizontal passageway 65 extends across the block and communicates with the bottom of the bores 54. This passageway 65 is intersected by a vertical cylindrical chamber 66 in the block between the bores 54. The chamber 66 extends downwardly below the passageway 65. This portion below the passageway is somewhat larger than the portion above the passageway and it contains a piston head 67 which reciprocates between an upper position in sealing contact with a seat 68 (see FIG. 13) and a lower position below the passageway 65 (see FIG. 14).

The head 67 is integral with the lower end of a stem 69, the upper end 79 of which passes upwardly through the block and is connected to the center of a cross bar 71. The outer ends of the bar 71 are attached to the upper ends of the valve stem 55 for coaction with the stem 69. A seal 72 is disposed in an annular groove 73 of the block surrounding the head 67 and another seal 74 is disposed in an annular groove 75 surrounding the upper end 70.

The block 52 is provided with an inlet passageway 76 for the sauce to be dispensed in communication with the upper portion of the cylindrical chamber 66. The outer end of the passageway 76 has an annular opening which is adapted to be coupled to an outlet pipe 77 of a sauce tank 78 by means of a coupling clamp 79. A flange 80 of the tank is adapted to hook over a pin 81 of a shelf bracket 82 for support.

The cross bar 71 is attached to the lower end of a push bar 83, the upper end of the push bar being slidably disposed in a sleeve 84 in the shelf bracket 82.

The push bar 83 is moved downwardly against the action of the springs 57 by a rocker arm 84 fulcrumed on a rocker shaft 85 in yoke bracket 85 attached to the block 52. The outer end of the arm 84 carries a button 86 of nylon or other suitable wear resistant material in contact with the upper end of the push bar 83. The button 86 is set in a holder 87 which is threadedly engaged with an aperture 88 of the rocker arm 84.

The opposite end of the rocker arm is provided with a cam follower in the form of a roller 89 which is normally disposed in contact with a rotating cam 90.

Figure 5:
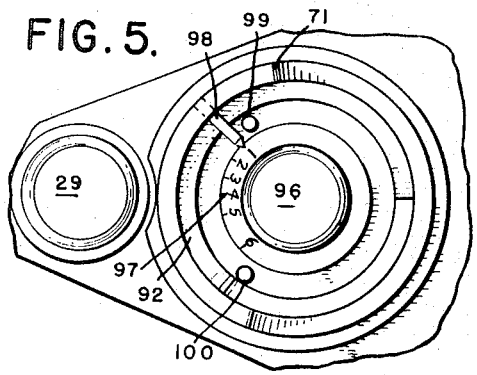
FIG. 5 (Sheet 3) is an enlarged view of a fragmentary portion of FIG. 2 with the cam selector in one of its extreme positions.
Figure 6:
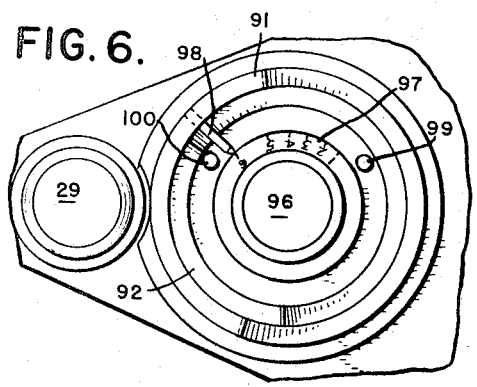
FIG. 6 (Sheet 3) is a view similar to FIG. 5 with the cam selector in the opposite extreme position.
Figure 7:
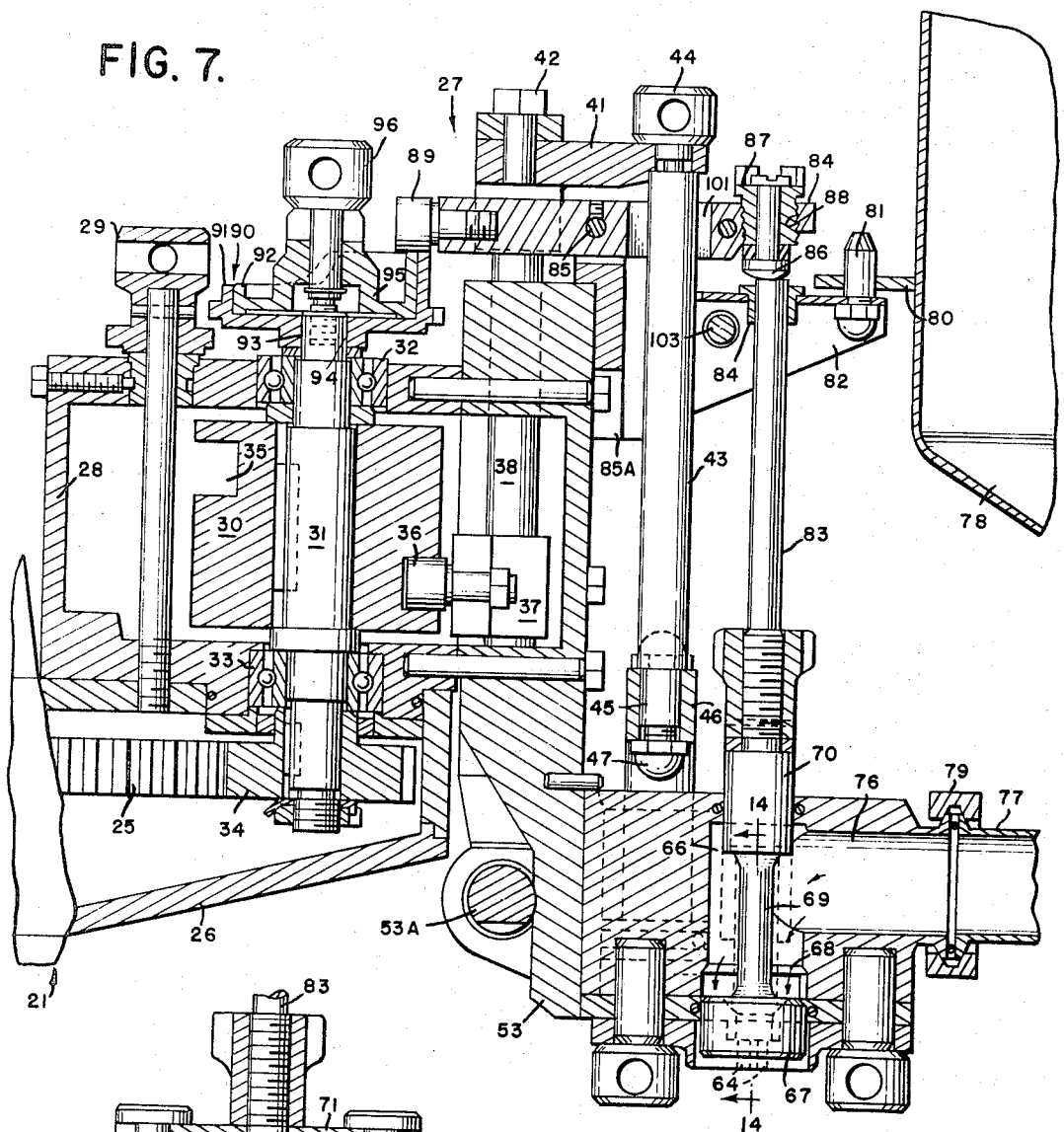
FIG. 7 (Sheet 4) is a section along the line 7—7 of FIG. 2.
Figure 8:
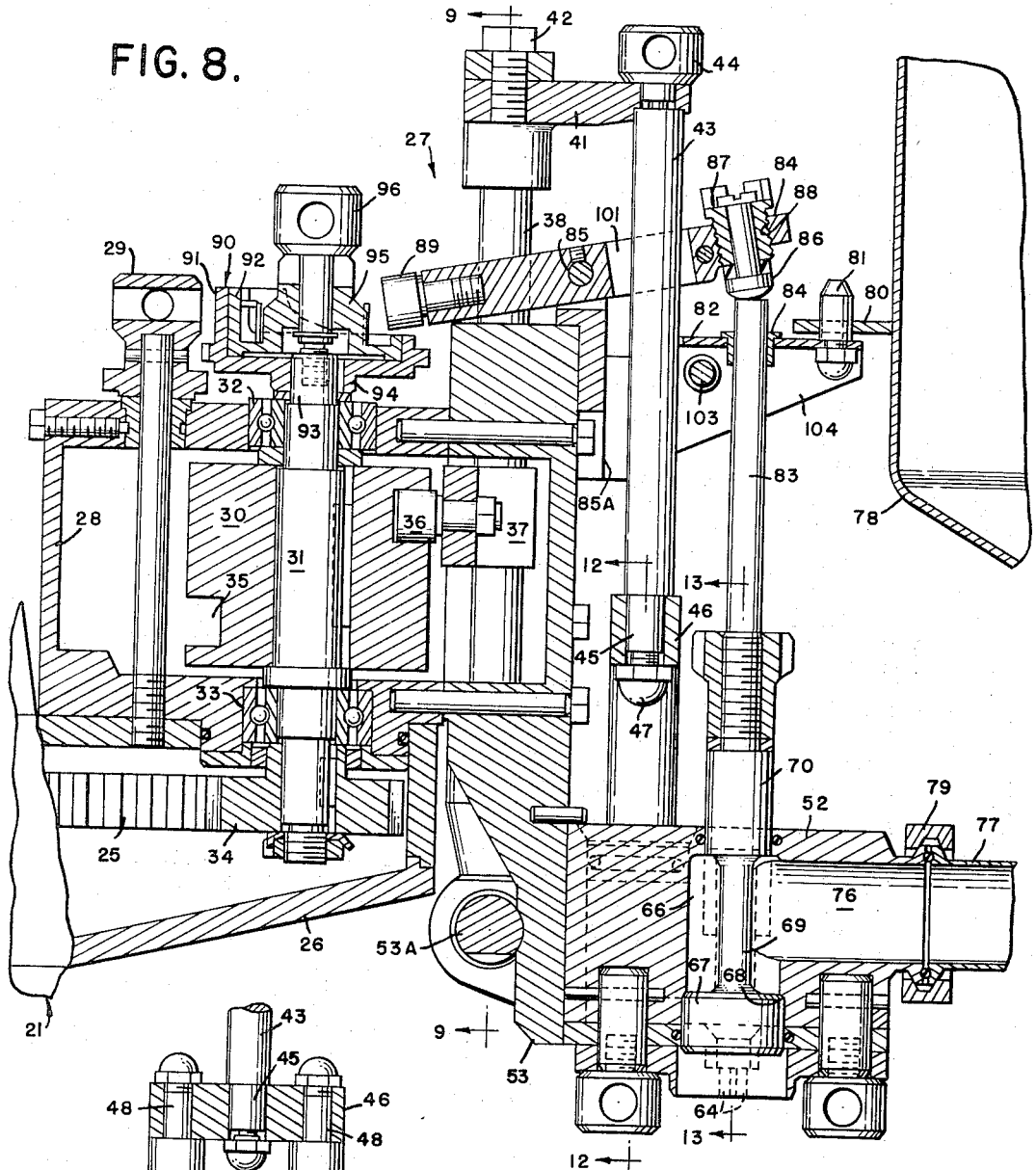
FIG. 8 (Sheet 5) is a view similar to FIG. 7 with the parts in a different position to illustrate the operation thereof.
Figure 12:
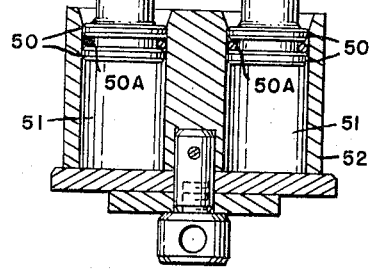
FIG. 12 (Sheet 5) is a vertical sectional view along the line 12—12 of FIG. 8.

The cam 90 comprises an outer section 91 and an inner section 92 which are concentrically mounted relative to each other on an upper extension 92 of the shaft 31 projecting above the bearing 32. The outer section 91 has a hub 94 that fits on the end of the extension 93 and the inner section 92 has a hub section 95 by means of which it is secured to the extension with a clamping bolt 96. By these means, the cyclic operation of the rocker arm 84 can be varied by changing the rotational positions of the inner and outer sections 91 and 92 relative to each other. In the positions shown in FIG. 5, for example, the rocker arm will hold the stem 83 down against the action of the springs 57, a greater part of each rotation of the cam, thereby resulting in a greater quantity of sauce being dispensed for each cycle of operation. In the position shown in FIG. 6, a shorter dwell period is provided with the result that less sauce is delivered on each cycle of rotation of the cam 90.

The relative positions of the cam sections 91 and 92 are changed by simply loosening the bolt 96, resetting the sections to the desired relative positions, and then re-tightening the bolt. The hub 95 of the cam section 92 is provided with a scale 97, and the cam section 91 with a pointer in the form of a horizontal pin 98 projecting inwardly adjacent to the scale to indicate different relative positions and to permit resetting to selected positions once calibrated. The inner cam section 92 also carries a pair of vertical abutment pins 99 and 100 to contact the pin 98 within the limits of adjustment.

The rocker arm 84 is provided with an aperture 101 through which the connecting rod 43 passes. This aperture is sufficiently large to provide clearance between it and the rod in all positions of the rocker arm.

Figure 4:
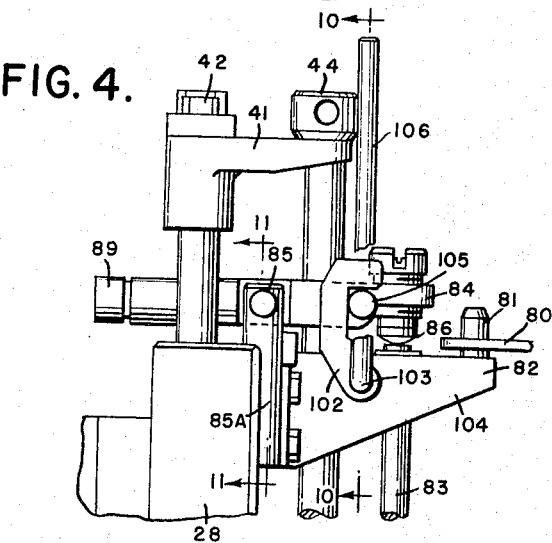
FIG. 4 (Sheet 2) is an enlarged fragmentary portion of FIG. 1 with the rocker arm member in its inoperative postion.
Figure 11:
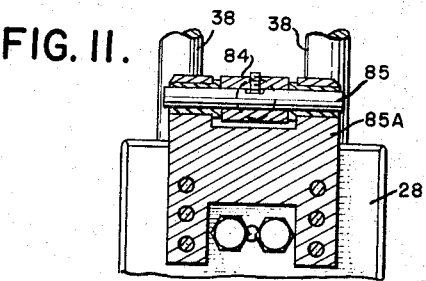
FIG. 11 (Sheet 2) is a vertical sectional view along the line 11—11 of FIG. 4.
Figure 10:
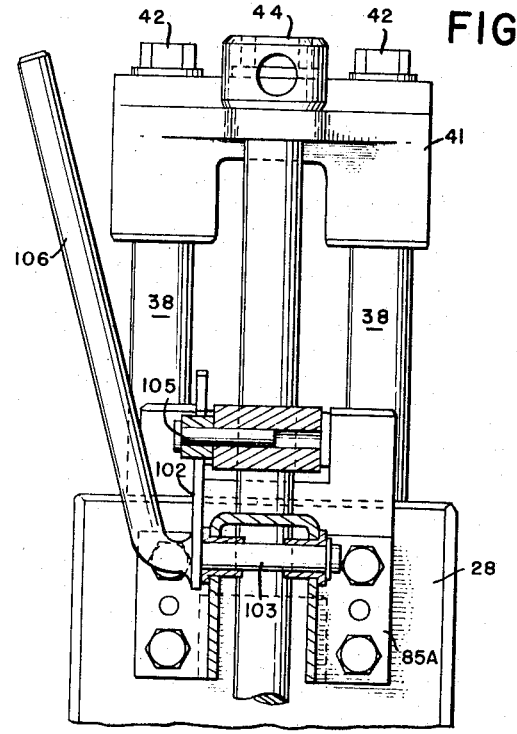
FIG. 10 (Sheet 3) is a vertical sectional view along the line 10—10 of FIG. 4.
Figure 16:
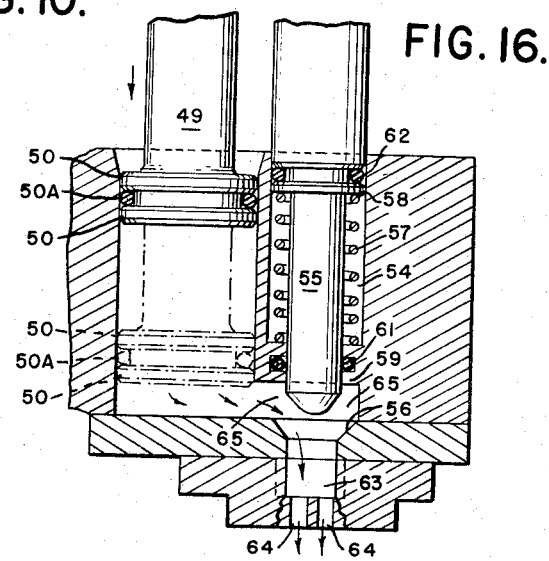
FIG. 16 (Sheet 3) is a view similar to FIG. 15 with the parts moved to a different position to illustrate the operation thereof.
Figure 15:
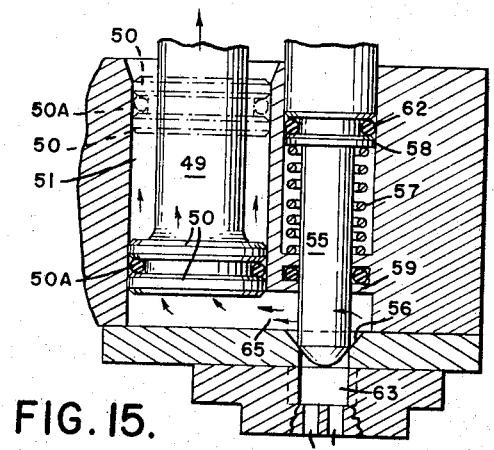
FIG. 15 (Sheet 3) is a sectional view along the line 15—15 of FIG. 3.

The hold down hook 102 is secured to a transverse shaft 103 carried by side plates 104 of the shelf bracket 82. The hook 102 is adapted in one position to engage a finger 105 carried by the rocker arm 84 (see FIG. 4) and thereby hold the cam follower 89 out of contact with the cam 90, thereby arresting operation of the device. In its release position (FIG. 1) the finger 105 moves clear of the hook without restraint. A crank handle 106 is integral with the shaft 103 and facilitates manual adjustment of the hook between its position of engagement and disengagement.

In operation the sauce to be dispensed is placed in the tank 78 from which it flows by gravity through the pipe 77 into the passageway 76 and chamber 66. From the chamber 66, the sauce is metered through the outlet openings 64 by the pump action of the piston heads 50 controlled by the valving action of the head 67 in the chamber 66 and of the valve stems 55 in relation to the valve seats 56.

On the upstroke of the piston heads 50, the head 67 is in its lowermost position disengaged from the seat 68, whereby the sauce is drawn into the chamber 66 through the passageway 65 into the pump cylinders 51. On the downstroke of the piston heads 58, the valve stems 55 are unseated and the head 67 is brought into engagement with the seat 68. The latter engagement blocks flow of sauce back into the inlet passageway 76 whereby the sauce is constrained to flow into the now open passageways 63 into the outlet openings 64.

Adjustment of the relative positions of inner and outer cam sections 91 and 92 advance or retard the actuation of the head 67 and hence result in a greater or lesser amount of sauce being delivered. A lesser amount is achieved by virtue of more advanced actuation of the head 67 downward which, in effect, causes a by passing of part of the sauce from the bores 51 back into the passageway 76, instead of being directed entirely into passageways 63.

I claim:

1. A device for dispensing liquids comprising a chamber for receiving liquid from a source, a pump for charging the chamber with liquid from the source, an outlet nozzle, a passageway between the chamber and nozzle, a first valve for controlling the flow of liquid from the chamber into the passageway, a second valve for controlling the flow of liquid from the passageway to the nozzle, and means for opening and closing said valves in alternating relation to each other.

2. A device as defined by claim 1 and means for operating the pump cyclically in phase relation to the operation of the valves to cause a specific unit quantity of liquid to be discharged from the nozzle during each cycle of operation.

3. A device as defined by claim 2 and means for changing the relative phase operation of the valves and pump to effect a change in the unit quantity of liquid discharged on each cycle of operation.

4. A device as defined by claim 3 in which the means for changing the relative phase operation comprises a variable rotary cam and a cam follower engaging the cam.

References Cited

UNITED STATES PATENTS

| 1,990,263 | 2/1935 | Benedek | 103—37 |
| 2,001,336 | 5/1935 | Vago | 103—37 |
| 2,006,879 | 7/1935 | Benedek | 103—37 |
| 2,359,513 | 10/1944 | Eden | 103—37 |

FOREIGN PATENTS 474,577  11/1937  Great Britain.

ROBERT M. WALKER, *Primary Examiner.*

LAURENCE V. EFNER, *Examiner.*